United States Patent
You et al.

(10) Patent No.: US 10,243,642 B2
(45) Date of Patent: Mar. 26, 2019

(54) METHOD AND BASE STATION FOR RECEIVING SYSTEM INFORMATION, AND METHOD AND USER EQUIPMENT FOR TRANSMITTING SYSTEM INFORMATION

(71) Applicant: LG ELECTRONICS INC., Seoul (KR)

(72) Inventors: Hyangsun You, Seoul (KR); Kijun Kim, Seoul (KR); Eunsun Kim, Seoul (KR); Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/494,221

(22) Filed: Apr. 21, 2017

(65) Prior Publication Data

US 2017/0311342 A1 Oct. 26, 2017

Related U.S. Application Data

(60) Provisional application No. 62/326,012, filed on Apr. 22, 2016.

(51) Int. Cl.
*H04W 48/12* (2009.01)
*H04B 7/06* (2006.01)
*H04B 7/08* (2006.01)
*H04L 5/00* (2006.01)

(52) U.S. Cl.
CPC ........... *H04B 7/0695* (2013.01); *H04B 7/088* (2013.01); *H04L 5/0023* (2013.01); *H04L 5/0053* (2013.01); *H04W 48/12* (2013.01); *H04L 5/0007* (2013.01)

(58) Field of Classification Search
CPC ......... H04B 7/0695; H04B 7/088; H04L 5/00; H04W 48/12
See application file for complete search history.

(56) References Cited

U.S. PATENT DOCUMENTS

| 8,121,079 | B2* | 2/2012 | Geng | H04B 7/022 370/329 |
| 9,794,861 | B2* | 10/2017 | Kumar | H04W 48/12 |
| 2011/0086608 | A1* | 4/2011 | Yamagishi | G08B 27/006 455/404.1 |
| 2014/0036838 | A1* | 2/2014 | Yoo | H04L 1/0038 370/329 |
| 2016/0095112 | A1* | 3/2016 | Panteleev | H04W 76/14 370/329 |
| 2016/0198024 | A1* | 7/2016 | Yu | H04L 1/0072 370/312 |
| 2018/0035468 | A1* | 2/2018 | Ishii | H04W 74/0833 |
| 2018/0110066 | A1* | 4/2018 | Luo | H04W 72/1284 |

* cited by examiner

*Primary Examiner* — Lan-Huong Truong
(74) *Attorney, Agent, or Firm* — Lee Hong Degerman Kang Waimey

(57) ABSTRACT

Disclosed herein are a method and apparatus for transmitting/receiving system information. The base station transmits a plurality of first type system information (SIs), and transmits a plurality of second type SIs according to the respective plurality of first type SIs. The plurality of first type SIs are transmitted on different first SI time resources, respectively. The plurality of first type SIs may schedule different second time resources for the second type Sis, respectively.

8 Claims, 9 Drawing Sheets

METHOD AND BASE STATION FOR RECEIVING SYSTEM INFORMATION, AND METHOD AND USER EQUIPMENT FOR TRANSMITTING SYSTEM INFORMATION

CROSS-REFERENCE TO RELATED APPLICATIONS

Pursuant to 35 U.S.C. § 119(e), this application claims the benefit of U.S. Provisional Patent Application No. 62/326,012, filed on Apr. 22, 2016, the contents of which are hereby incorporated by reference herein in its entirety.

TECHNICAL FIELD

The present invention relates to a wireless communication system, and more particularly, to a method and apparatus for transmitting/receiving system information.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more and more communication devices require greater communication capacity, there is a need for improved mobile broadband communication over legacy radio access technology (RAT). In addition, massive machine type communication (mMTC) for connecting multiple devices and objects to each other to provide various services anytime and anywhere is one of the major issues to be considered in next generation communication.

There is also a discussion on communication systems to be designed in consideration of reliability and latency-sensitive services/UEs. Introduction of next generation radio access technology is being discussed in terms of improved mobile broadband communication (eMBB), mMTC, and ultra-reliable and low latency communication (URLLC).

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a system for transmitting/receiving signals in a system supporting a new radio access technology is required.

The technical objects that can be achieved through the present invention are not limited to what has been particularly described hereinabove and other technical objects not described herein will be more clearly understood by persons skilled in the art from the following detailed description.

SUMMARY

The object of the present invention can be achieved by providing a method for transmitting system information by a base station. The method comprises: transmitting a plurality of first type system information (SIs), and transmitting a plurality of second type SIs according to the respective first type SIs. The plurality of first type SIs are respectively transmitted on first SI time resources different from each other. The plurality of first type SIs may schedule different second time resources for the plurality of second type SIs, respectively.

In another aspect of the present invention, provided herein is a base station for transmitting system information. The base station includes a radio frequency (RF) unit and a processor configured to control the RF unit. The processor is configured to control the RF unit to transmit a plurality of first type system information (SIs), and control the RF unit to transmit a plurality of second type SIs according to the plurality of first type SIs, respectively. The plurality of first type SIs are transmitted on first SI time resources different from each other. The plurality of first type SIs may schedule different second time resources for the plurality of second type SIs, respectively.

In another aspect of the present invention, provided herein is a method for receiving system information by a user equipment. The method comprises: receiving a first type system information (SI) among a plurality of first type SIs, and receiving a second type SI according to the received first type SI. The plurality of first type SIs are respectively present on first SI time resources different from each other. The plurality of first type SIs may schedule different second time resources for a plurality of second type SIs, respectively.

In another aspect of the present invention, provided herein is a user equipment for receiving system information. The user equipment includes a radio frequency (RF) unit, and a processor configured to control the RF unit. The processor is configured to control the RF unit to receive a first type system information (SI) among a plurality of first type SIs, and control the RF unit to receive a second type SI according to the received first type SI. The first type SIs are present on first SI time resources different from each other. The plurality of first type SIs may schedule different second time resources for a plurality of second type SIs, respectively.

In each aspect of the present invention, the first SI time resources may be predefined.

In each aspect of the present invention, the first plurality of type SIs may correspond to different beam directions of the base station.

In each aspect of the present invention, each of the plurality of first type SIs or each of the plurality of second type SIs may include information on a random access channel resource corresponding thereto.

In each aspect of the present invention, each of the plurality of first type SIs or each of the plurality of second type SIs may include information on a set of downlink subframes for a corresponding SI that may be monitored by a user equipment.

According to the present invention, uplink/downlink signals can be efficiently transmitted/received. Therefore, overall throughput of a radio communication system can be improved.

According to one embodiment of the present invention, a low cost/complexity UE can perform communication with a BS at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a base station may be reduce.

In addition, with development of smart devices, a small amount of data or data which are less frequently generated may be efficiently transmitted/received.

Signals may be transmitted/received in a system supporting a new radio access technology.

According to an embodiment of the present invention, a small amount of data may be efficiently transmitted/received.

BRIEF DESCRIPTION OF THE DRAWING

The accompanying drawings, which are included to provide a further understanding of the invention, illustrate embodiments of the invention and together with the description serve to explain the principle of the invention.

DETAILED DESCRIPTION

Figure 1:
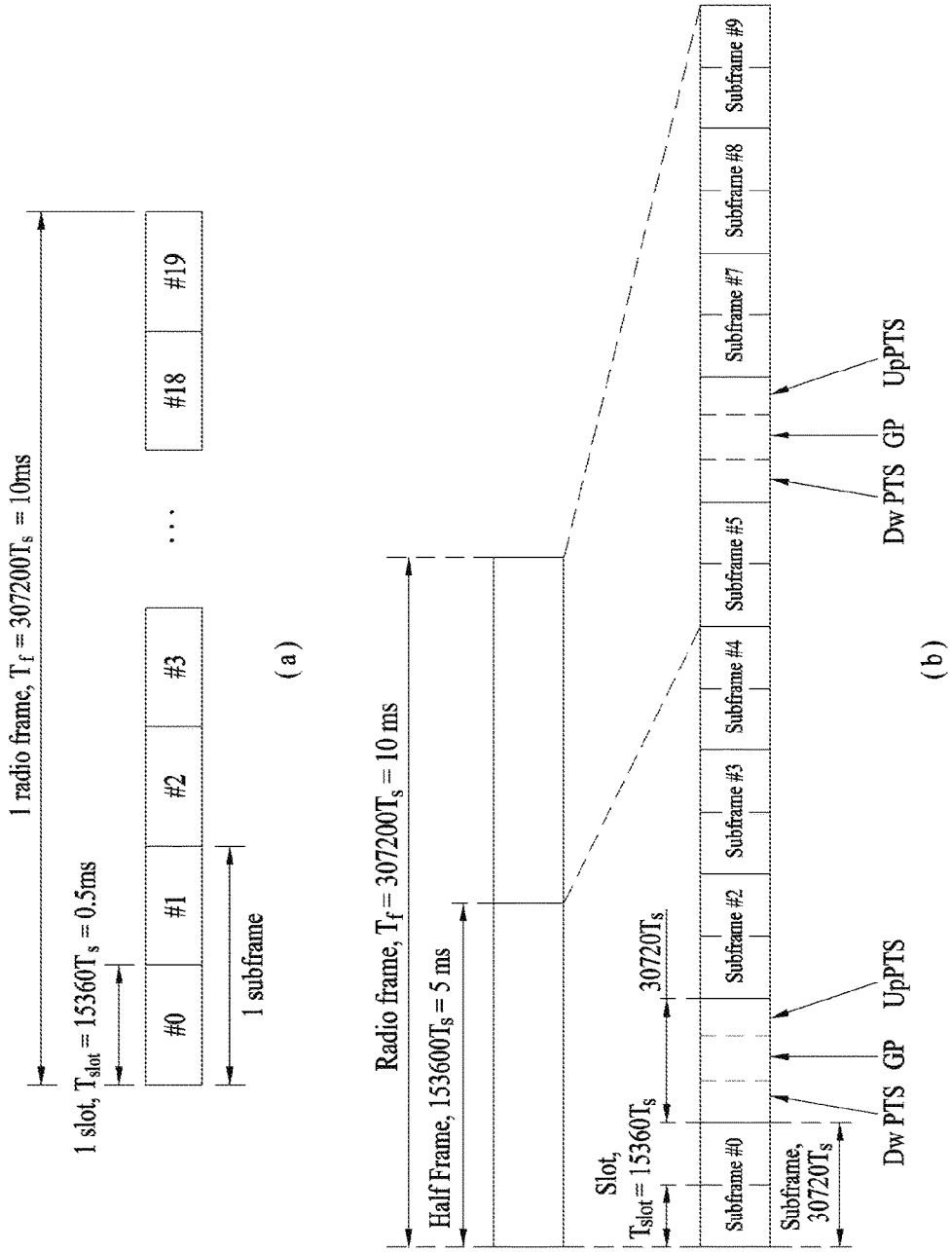
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For the terms and techniques which are used herein but not specifically described, the 3GPP LTE/LTE-A standard documents, for example, 3GPP TS 36.211, 3GPP TS 36.212, 3GPP TS 36.213, 3GPP TS 36.321 and 3GPP TS 36.331, and the like may be referenced.

FIG. 1 illustrates the structure of a radio frame used in a LTE/LTE-A based wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

TTI refers to an interval during which data may be scheduled. For example, referring to FIGS. 1 and 3, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1 ms.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
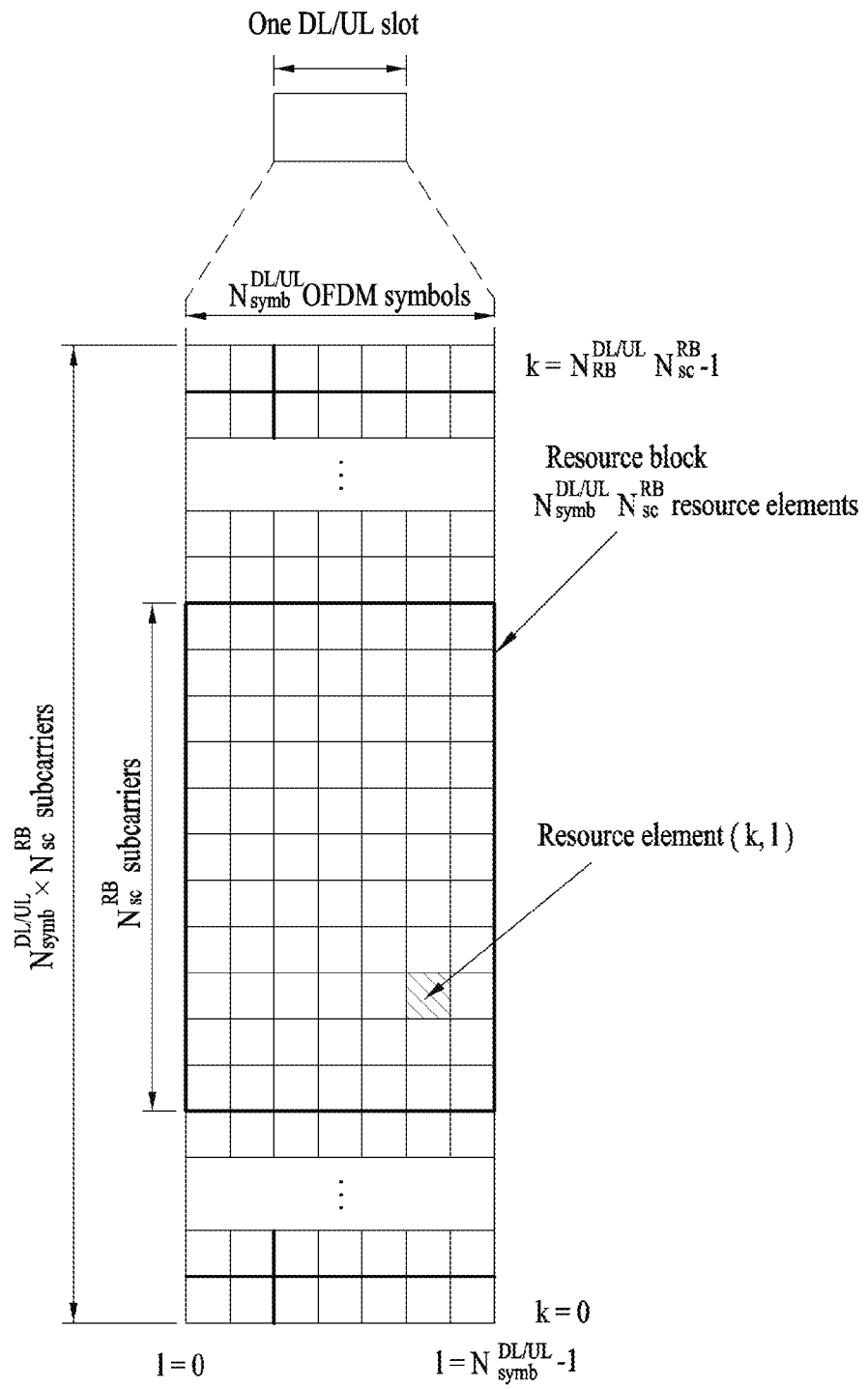
FIG. 2 illustrates the structure of a downlink (DL)/uplink (UL) slot in a wireless communication system.

FIG. 2 illustrates the structure of a DL/UL slot structure in a LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
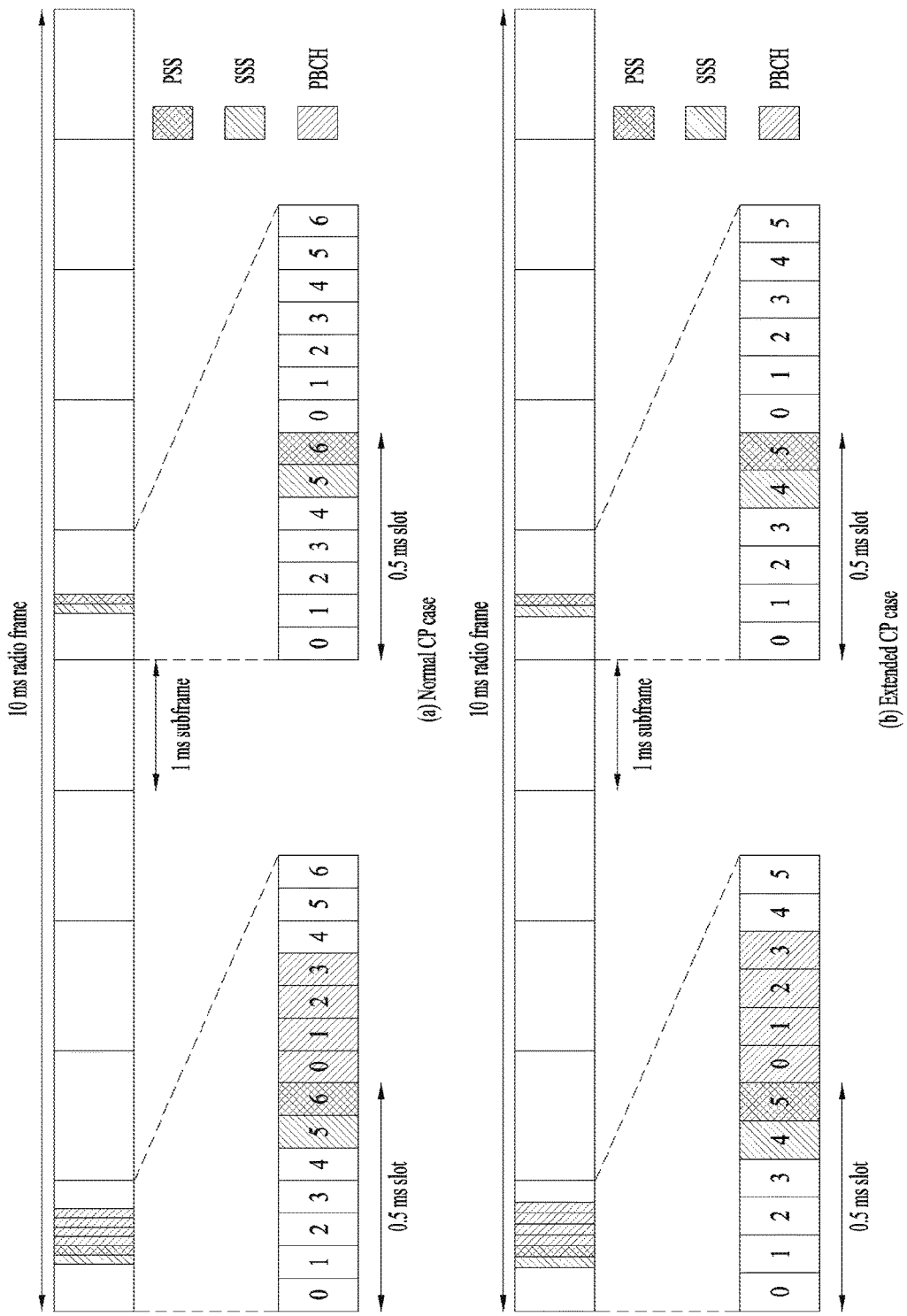
FIG. 3 illustrates a radio frame structure for transmission of a synchronization signal (SS) in a LTE/LTE-A based wireless communication system.

FIG. 3 illustrates a radio frame structure for transmission of a synchronization signal (SS) in a LTE/LTE-A based wireless communication system. Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

Upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

The UE, which has determined time and frequency parameters necessary for demodulating a DL signal and transmitting a UL signal at an accurate time by performing a cell search procedure using PSS/SSS, can communicate with the eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB 1), SIB Type 2 (SIB2), and SIB3 to SIB17 in accordance with the parameters.

The MIB includes most frequently transmitted parameters which are essential for initial access of the UE to a network of the eNB. The UE may receive the MIB through a broadcast channel (e.g. PBCH). The MIB includes a DL bandwidth (BW), PHICH configuration, and a system frame number (SFN). Accordingly, the UE may be explicitly aware of information about the DL BW, SFN, and PHICH configuration by receiving the MIB. Meanwhile, information which may be implicitly recognized by the UE through reception of the PBCH includes the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The SIB1 includes parameters needed to determine if a specific cell is suitable for cell selection, as well as information about time-domain scheduling of the other SIBs. The SIB1 is received by the UE through broadcast signaling or dedicated signaling.

DL carrier frequency and corresponding system bandwidth may be acquired by the MIB carried by the PBCH. UL carrier frequency and corresponding system bandwidth may be acquired by system information which is a DL signal. The UE which has received the MIB applies a DL BW value within the MIB to a UL-bandwidth (UL BW) until system information block type 2 (SystemInformationBlockType2, SIB2) is received if there is no valid system information stored in a corresponding cell. For example, the UE may identify a full UL system band, which may be used by itself for UL transmission, through UL-carrier frequency and UL-bandwidth information within the SIB2 by acquiring system information block type 2 (SystemInformationBlockType2, SIB2).

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDDCH/PDSCH reception and PUSCH/PUCCH transmission as general uplink/downlink transmission procedures.

The random access procedure is also called RACH (random access channel) procedure. The random access procedure is used for initial access, uplink synchronization adjustment, resource assignment, handover, etc. The random access procedure is classified into a contention-based process and a dedicated (i.e. non-contention-based) process. The contention-based random access procedure includes initial access and is normally used, whereas the dedicated random access procedure is limitedly used for handover. In the contention-based random access procedure, a UE randomly select a RACH preamble sequence. Accordingly, a plurality of UEs can simultaneously transmit the same RACH preamble sequence and thus a contention resolution procedure is not needed. In the dedicated random access procedure, a UE uses a RACH preamble sequence uniquely allocated thereto by an eNB. Accordingly, the UE can perform the random access procedure without colliding with other UEs.

The contention-based random access procedure has the following four steps. Hereinafter, messages transmitted in steps 1 to 4 may be respectively referred to as Msg 1 to Msg 4.

Step 1: RACH preamble (via PRACH) (UE to eNB)
Step 2: Random access response (RAR) (via PDCCH and PDSCH) (eNB to UE)
Step 3: Layer 2/Layer 3 message (via PUSCH) (UE to eNB)
Step 4: Contention resolution message (eNB to UE)

The dedicated random access procedure includes the following three steps. Hereinafter, uplink transmission (i.e. step 3) corresponding to a RAR may be performed as a part of the random access procedure. The dedicated random access procedure can be triggered using a PDCCH (hereinafter, referred to as PDCCH order) used for an eNB to command RACH preamble transmission.

Step 0: PACH preamble allocation through dedicated signaling (eNB to UE)
Step 1: RACH preamble (via PRACH) (UE to eNB)
Step 2: RAR (via PDCCH and PDSCH) (eNB to UE)

After transmission of RACH preamble, the UE attempts to receive a random access response (RAR) within a predetermined time window. Specifically, the UE attempts to detect a PDCCH (hereinafter, referred to as RA-RNTI PDCCH) having an RA-RNTI (Random Access RNTI) (e.g., CRC is masked with RA-RNTI in the PDCCH) within the time window. The UE checks whether a RAR therefor is present in a PDSCH corresponding to the RA-RNTI PDCCH during RA-RNTI PDCCH detection. The RAR includes timing advance (TA) information indicating timing offset information for UL synchronization, UL resource allocation information (UL grant information), a temporary UE identifier (e.g., temporary cell-RNTI, TC-RNTI), etc. The UE can perform UL transmission (e.g., Msg3) in accordance with resource allocation information and TA value in the RAR. HARQ is applied to UL transmission corresponding to the RAR. Accordingly, the UE can receive acknowledgement information (e.g., PHICH) corresponding to Msg 3 after transmission of Msg 3.

Figure 4:
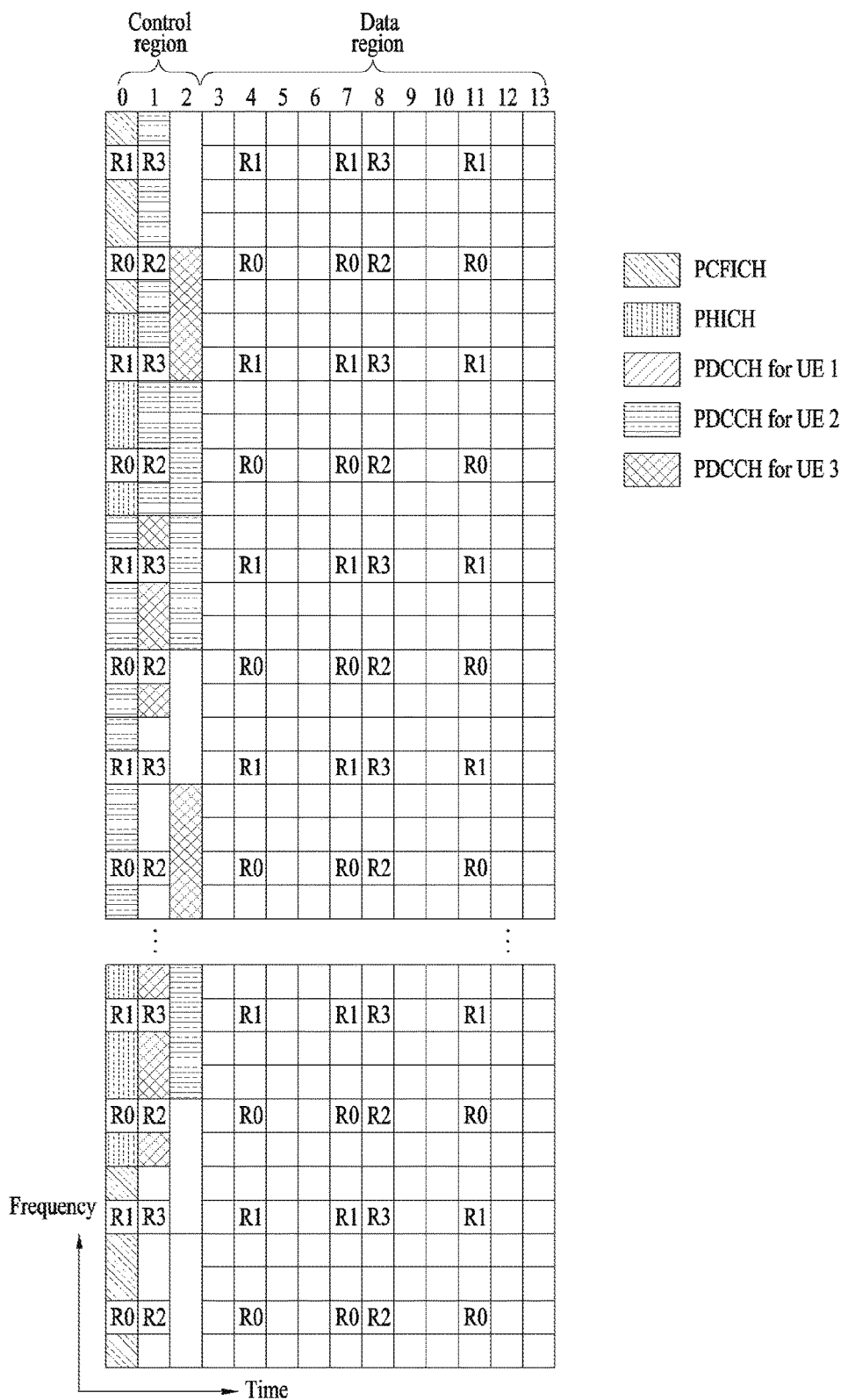
FIG. 4 illustrates the structure of a DL subframe used in a wireless communication system.

FIG. 4 illustrates the structure of a DL subframe used in a LTE/LTE-A based wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE/LTE-A include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH carries a control format indicator (CFI), which indicates any one of values of 1 to 3. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode. The UE may decode a PDSCH in accordance with DCI based on the DCI format successfully decoded. A transmission mode is semi-statically configured for the UE by the upper layer such that the UE may receive PDSCHs transmitted according to one of a plurality of predetermined transmission modes. The UE attempts to decode the PDCCH only in DCI formats corresponding to the transmission mode thereof. For example, tries to decode PDCCH candidates of a UE-specific search space (USS) to a fallback DCI (e.g., DCI format 1A), and tries to decode PDCCH candidates of a common search space (CSS) and the USS to a DCI format specific to a transmission mode with which the UE is configured. In other words, in order to maintain the computational load of the UE according to blind decoding attempts below a certain level, not all DCI formats are simultaneously searched by the UE.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=floor(N_{REG}/9)$. The control region of each serving cell consists of a set of CCEs, numbered from 0 to $N_{CCE,k}-1$, where $N_{CCE,k}$ is the total number of CCEs in the control region of subframe k. A PDCCH consisting of n consecutive CCEs may only start on a CCE fulfilling i mod n=0, where i is the CCE number.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level $L \in \{1, 2, 4, 8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs. The following table shows an example of aggregation levels for defining SS.

TABLE 1

| Type | Search space $S^{(L)}_k$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For each serving cell on which PDCCH is monitored, the CCEs corresponding to PDCCH candidates m of the search space $S^{(L)}_k$ are configured by "L*{($Y_k$+m') mod floor($N_{CCE,k}$/L)}+i", where i=0, . . . , L-1. For the common search space m'=m. For the PDCCH UE specific search space, for the serving cell on which PDCCH is monitored, if the monitoring UE is configured with carrier indicator field then m'=m+$M^{(L)}$*$n_{CI}$ where $n_{CI}$ is the carrier indicator field (CIF) value, else if the monitoring UE is not configured with carrier indicator field then m'=m, where m=0, 1, . . . , $M^{(L)}$-1. $M^{(L)}$ is the number of PDCCH candidates to monitor at aggregation level L in the given search space. The carrier indication field value can be the same as a serving cell index (ServCellIndex). For the common search space, $Y_k$ is set to 0 for the two aggregation levels L=4 and L=8. For the UE-specific search space $S^{(L)}_k$ at aggregation level D, the variable $Y_k$ is defined by "$Y_k$=(A·$Y_{k-1}$) mod D", where $Y_{-1}=n_{RNTI} \neq 0$, A=39827, D=65537 and k=floor($n_s$/2). $n^s$ is the slot number within a radio frame.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 5:
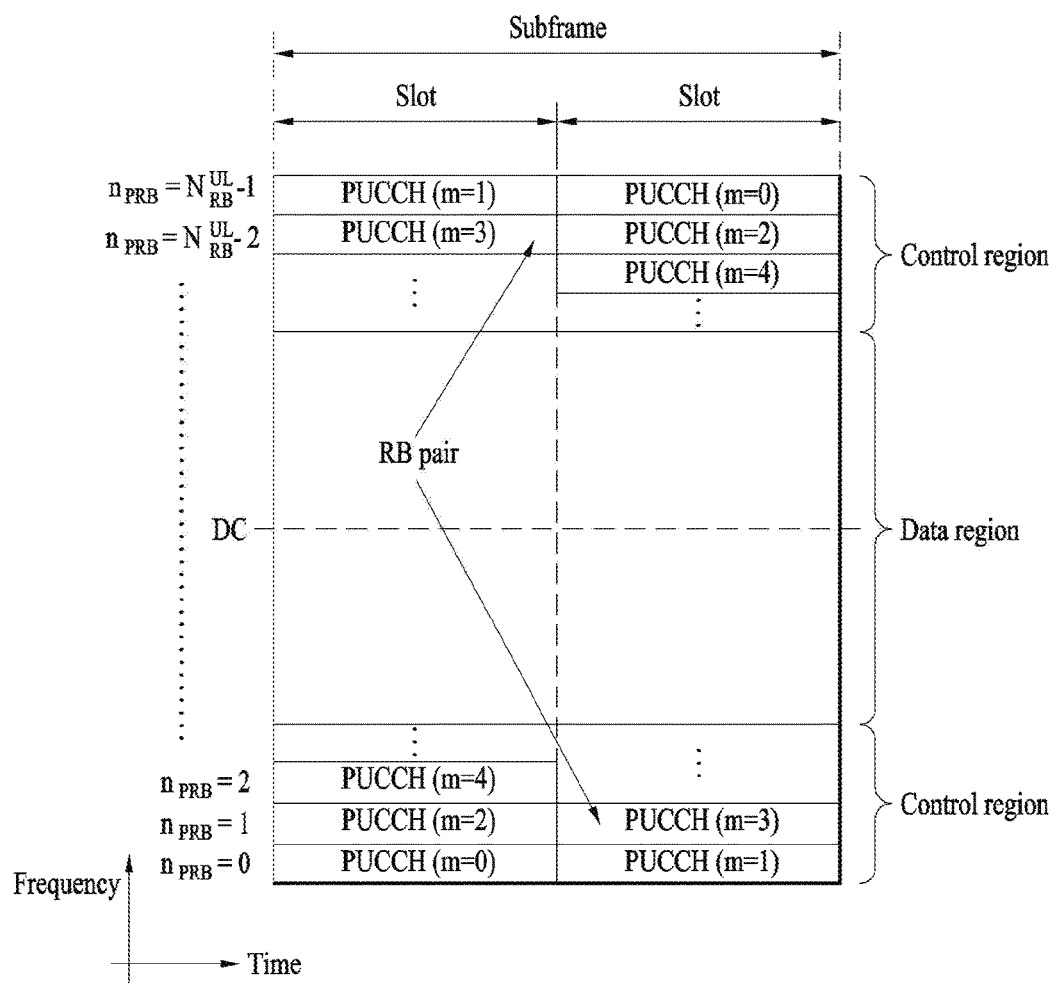
FIG. 5 illustrates the structure of a UL subframe used in a wireless communication system.

FIG. 5 illustrates the structure of a UL subframe used in a LTE/LTE-A based wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH)

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that (those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

As one method of reducing the cost of an MTC UE, the MTC UE may operate in, for example, a reduced DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs), or multiple sub-bands for MTC may be provided in one subframe to multiplex MTC UEs in the subframe such that the UEs use different sub-bands or use the same sub-band which is not a sub-band consisting of the 6 center PRBs.

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE. As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy PDCCH/EPDCCH, may be introduced for the MTC UE.

A data channel (e.g., PDSCH, PUSCH) and/or control channel (e.g., M-PDCCH, PUCCH, PHICH) may be transmitted across multiple subframes to implement coverage enhancement (CE) of the UE, using a repetition technique or TTI bundling technique. On behalf of the CE, a control/data channel may be transmitted additionally using techniques such as cross-subframe channel estimation and frequency (narrowband) hopping. Herein, the cross-subframe channel estimation refers to a channel estimation technique using not only a reference signal in a subframe having a corresponding channel but also a reference signal in neighboring subframe(s).

The MTC UE may need CE up to, for example, 15 dB. However, not all MTC UEs are present in an environment which requires CE. In addition, the QoS requirements for MTC UEs are not identical. For example, devices such as a sensor and a meter have a low mobility and a small amount of data to transmit/receive and are very likely to be positioned in a shaded area. Accordingly, such devices may need high CE. On the other hand, wearable devices such as a smart watch may have mobility and are very likely to have a relatively large amount of data to transmit/receive and to be positioned in a place other than the shaded area. Accordingly, not all MTC UEs need a high level of CE, and the required capability may depend on the type of an MTC UE.

According to LTE-A Rel-13, CE may be divided into two modes. In a first mode (referred to as CE mode A), transmission may not be repeated or may be repeated only a few times. In a second mode (or CE mode B), many repetitions of transmission are allowed. A mode to enter between the two modes may be signaled to the MTC UE. Herein, parameters that a low-complexity/low-cost UE assumes for transmission/reception of a control channel/data channel may depend on the CE mode. In addition, the DCI format which the low-complexity/low-cost UE monitors may depend on the CE mode. Transmission of some physical channels may be repeated the same number of times regardless of whether the CE mode is CE mode A or CE mode B.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 6:
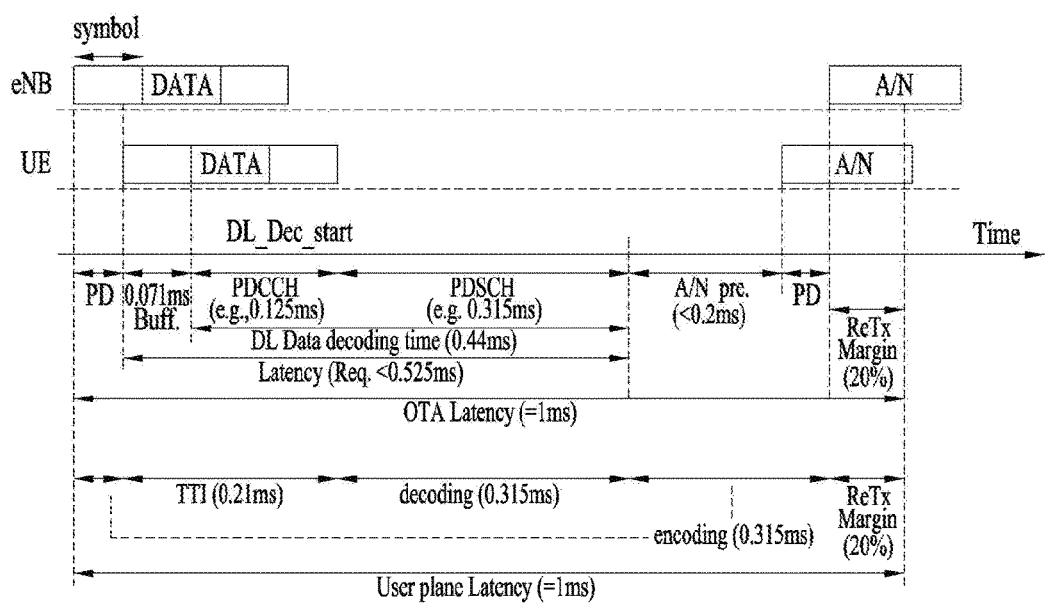
FIG. 6 illustrates the length of a transmission time interval (TTI) which is needed to implement low latency.

FIG. 6 illustrates the length of a transmission time interval (TTI) which is needed to implement low latency.

Referring to FIG. 6, a propagation delay (PD), a buffering time, a decoding time, an A/N preparation time, an uplink PD, and an OTA (over the air) delay according to a retransmission margin are produced while a signal transmitted from the eNB reaches the UE, the UE transmits an A/N for the signal, and the A/N reaches the eNB. To satisfy low latency, a shortened TTI (sTTI) shorter than or equal to 0.5 ms needs to be designed by shortening the TTI, which is the smallest unit of data transmission. For example, to shorten the OTA delay, which is a time taken from the moment the eNB starts to transmit data (PDCCH and PDSCH) until the UE completes transmission of an A/N for the data to the eNB, to a time shorter than 1 ms, the TTI is preferably set to 0.21 ms.

That is, to shorten the user plane (U-plane) delay to 1 ms, the sTTI may be set in the unit of about three OFDM symbols.

While FIG. 6 illustrates that the sTTI is configured with three OFDM symbols to satisfy 1 ms as the OTA delay or U-plane delay, an sTTI shorter than 1 ms may also be configured. For example, for the normal CP, an sTTI consisting of 2 OFDM symbols, an sTTI consisting of 4 OFDM symbols and/or an sTTI consisting of 7 OFDM symbols may be configured.

In the time domain, all 01-DM symbols constituting a default TTI or the OFDM symbols except the OFDM symbols occupying the PDCCH region of the TTI may be divided into two or more sTTIs on some or all frequency resources in the frequency band of the default TTI, namely the channel band or system band of the TTI. In contrast with the legacy LTE/LTE-A system, in which the length of a TTI is fixed to 1 ms, and thus all UEs and eNB perform signal transmission and reception in units of 1 ms, the present invention supports a system which has multiple TTI lengths, and one UE and one eNB may transmit and receive a signal using multiple TTI lengths. In particular, the present invention proposes a method of enabling the eNB and UE to communicate with each other while supporting various TTI lengths and variability when the TTI length is variable and a method of performing multiplexing for each channel and UE. While description of the present invention below is based on the legacy LTE-/LTE-A system, it is also applicable to systems other than the LTE/LTE-A system or RAT.

Embodiments of the present invention described below may be applied to a new radio access technology (RAT) system in addition to the 3GPP LTE/LTE-A system. As more and more communication devices demand larger communication capacity, there is a need for improved mobile broadband communication compared to existing RAT. Also, massive MTC, which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC, and URLLC (Ultra-Reliable and Low Latency Communication), is being discussed. In the present invention, this technology is referred to as new RAT for simplicity.

<OFDM Numerology>

The new RAT system uses an OFDM transmission scheme or a similar transmission scheme. For example, the new RAT system may follow the OFDM parameters defined in the following table.

TABLE 2

| Parameter | Value |
| --- | --- |
| Subcarrier-spacing (Δf) | 75 kHz |
| OFDM symbol length | 13.33 us |
| Cyclic Prefix(CP) length | 1.04 us/0/94 us |
| System BW | 100 MHz |
| No. of available subcarriers | 1200 |
| Subframe length | 0.2 ms |
| Number of OFDM symbol per Subframe | 14 symbols |

<Self-Contained Subframe Structure>

Figure 7:
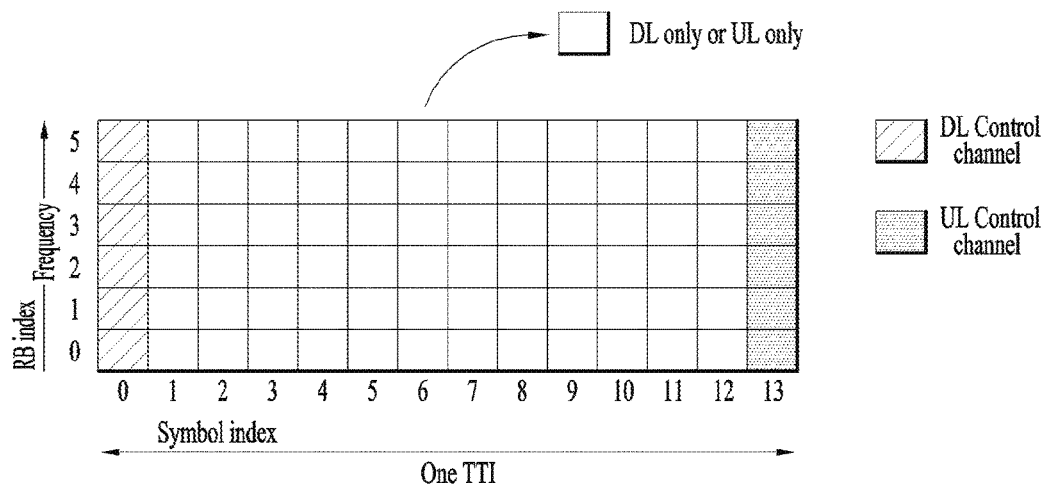
FIG. 7 illustrates a self-contained subframe structure.

FIG. 7 illustrates a self-contained subframe structure.

In order to minimize the latency of data transmission in the TDD system, a self-contained subframe structure is considered in the new fifth-generation RAT.

In FIG. 7, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 7, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

Referring to FIG. 7, a DL control channel on a wide band may be transmitted by time division multiplexing (TDM) with DL data or UL data. The eNB may transmit the DL control channel(s) over the entire band, but a UE may receive a DL control channel thereof in a specific band rather than the entire band. Here, the DL control channel refers to control information, which includes not only DL specific information such as DL scheduling but also information on cell configuration that the UE should know and UL specific information such as UL grant, transmitted from the eNB to the UE.

For example, a new RAT, referred to as mmWave and 5G, is expected to have a very large system bandwidth. Depending on the frequency band, 5 MHz, 10 MHz, 40 MHz, 80 MHz, etc. may have to be supported as minimum system bandwidth. The minimum system bandwidth may vary depending on the basic subcarrier spacing of the system. For example, when the basic subcarrier spacing is 15 kHz, the minimum system bandwidth is 5 MHz. When the basic subcarrier spacing is 30 kHz, the minimum system bandwidth is 10 MHz. When the basic subcarrier spacing is 120 kHz, the minimum system bandwidth is 40 MHz. When the basic subcarrier spacing is 240 kHz, the minimum system bandwidth may be 80 MHz. The new RAT is designed for sub-6 GHz and bands higher than or equal to 6 GHz and is also designed to support multiple subcarriers within a system to support various scenarios and use cases. When the subcarrier length is changed, the subframe length is also correspondingly reduced/increased. For example, one subframe may be defined as a short time such as 0.5 ms, 0.25 ms, or 0.125 ms. Higher frequency bands (e.g., higher than 6 GHz) may be used in the new RAT system, and a subcarrier spacing wider than the existing subcarrier spacing of 15 kHz in the legacy LTE system is expected to be supported. For example, when the subcarrier spacing is 60 kHz, one resource unit (RU) may be defined by 12 subcarriers on the frequency axis and one subframe on the time axis.

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ, (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

Figure 8:
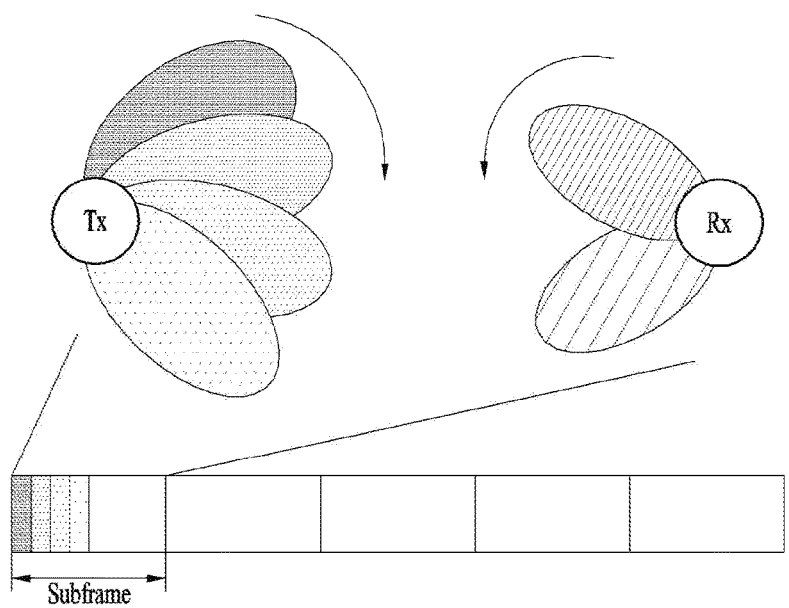
FIG. 8 illustrates an example of application of analog beamforming.

FIG. 8 illustrates an example of application of analog beamforming.

Referring to FIG. 8, a signal may be transmitted/received by changing the direction of a beam over time.

While a non-UE-specific signal (e.g., PSS/SSS/PBCH/SI) is transmitted omni-directionally in the LTE/LTE-A system, a scheme in which an eNB employing mmWave transmits a cell-common signal by omni-directionally changing the beam direction is considered. Transmitting/receiving signals by rotating the beam direction as described above is referred to as beam sweeping or beam scanning.

In general, to reduce data transmission/reception latency, the eNB may be allowed to schedule data for a specific UE anytime. In order to allow the eNB to schedule data for a specific UE anytime, the UE may monitor the PDCCH UE-specific search space (USS) in every subframe. However, UEs such as MTC UEs to which latency is not important may perform PDCCH monitoring only in some subframes in order to reduce monitoring complexity. For example, the UE may monitor only subframes in which PDCCH is determined or very likely to be transmitted according to the direction of the analog beam thereof.

In addition, in the cell-specific search space (CSS), the UE does not need to perform the monitoring operation in a subframe in which the control/data channel is transmitted in another beam direction. Accordingly, the UE may monitor only subframes in which the PDCCH is determined or very likely to be transmitted according to the direction of the analog beam thereof. For data scheduled in the CSS, namely, data scheduled by a control channel in the CSS, data for which latency is important is generally not transmitted. Therefore, in the case of the CSS, the concept of the UE monitoring only the subframes in which the PDCCH is determined or likely to be transmitted according to the analog beam direction thereof may be more useful.

In the present invention, a method of configuring the PDCCH CSS and/or the positions of subframes for monitoring the PDCCH CSS is proposed to limit subframes in which the UE monitors the PDCCH CSS and the USS.

A. CSS (or Group-Specific SS (i.e., GSS)) Monitoring

In the present invention, a method of configuring a subframes resource on which a UE monitors the CSS or broadcast data is proposed. As used herein, the term "monitoring subframes resource" may mean monitoring timing or a monitoring resource. Here, the CSS may represent a group-specific search space (GSS) transmitted for a specific UE group.

First System Information

A subframes resource position that the UE monitors to receive a channel carrying system information may be given as follows. Unlike other system information that is time-domain scheduled through SIB1, MIB and SIB1 are received in LTE without separate scheduling information. As used herein, the first system information may be system information that is received first in the LTE system without receiving other transmission channels such as SIB1 or MIB. For simplicity, in this specification, the first system information will be referred to as first SI.

Method 1-1: Information about a subframes position at which the first SI is transmitted according to an analog beam direction may be configured through the PBCH (or MIB) or defined in the specification in order to receive the first SI. For example, when there are N analog beam directions in which the first SI is transmitted, information about a subframes position (e.g., period, offset, and/or duration) at which the first SI is transmitted/transmittable may be defined. Here, the offset may represent the time or the number of subframes from a specific reference subframe to a start subframe in which the first SI is/may be present.

Method 1-2: Alternatively, information about the position of the subframes position at which the first SI according to an analog beam direction is transmitted/transmittable may be configured through the first SI. This is intended to allow the UE to recognize the subframe information to use to receive the first SI when the UE re-receives the first SI rather than when the UE receives the first SI for the first time. In this case, the UE may need to perform blind decoding/detection until it obtains the first SI that matches the beam direction for the UE.

In the present invention, the subframe in which the first SI is transmitted/transmittable may refer to a subframe in which a PDCCH scheduling the first SI is monitored through the CSS. Alternatively, the subframe in which the first SI is transmitted/transmittable may refer to a subframe in which the UE receives/attempts to receive a PDCCH scheduling the first SI. The PDCCH scheduling the SI may refer to a PDCCH scrambled with SI-RNTI. The present invention includes monitoring the PDCCH scheduling the first SI through the USS other than the CSS.

Other System Information

After receiving the first SI, the UE may additionally receive other SIs. The subframes resource position monitored by the UE in order to receive a channel carrying such additional system information may be configured as follows.

Method 2-1: In order to receive SIs other than the first SI, a subframe in which the corresponding SI is transmitted/transmittable according to the analog beam direction may be configured in the first SI or SI which UE(s) receive before the SI to be received is transmitted. For example, the configuration information about a subframe in which specific SI is transmitted or transmittable according to the analog beam direction may be included in SI including the scheduling information about the specific SI. In this case, in the first SI or SI that UE(s)) receive before SI to be received is transmitted, subframes position information (e.g., period, offset, and/or duration) on which the first SI for each of all analog beam directions in which the corresponding SI is transmitted is transmitted/transmittable may be configured.

Method 2-2: In order to receive SIs other than the first SI, a subframe in which the corresponding SI is transmitted/transmittable is configured by the first SI or SI that the UE(s) receive before SI to be received is transmitted may be configured. In this case, information about only one SI transmission subframe may be configured, in place of information about SI transmission subframes for the respective analog beam directions. In this case, the position of the transmission subframe of the configured SI may vary depending on the analog beam direction in which the SI for providing the configuration information is transmitted. For example, the first SI transmitted in analog beam direction A may indicate a transmission resource for secondly received SI for analog beam direction A, and the first SI for analog beam direction B may indicate secondly received SI for analog beam direction B.

Method 2-3: In order to receive SIs other than the first SI, once a subframe in which the corresponding SI is transmitted/transmittable is configured by the first SI or SI that the UE(s) receive before SI to be received is transmitted is configured, the transmission subframes position (e.g., offset value) of the SI according to the analog beam direction may be determined according to a predetermined equation or rule. For example, when the subframe period in which the SI is transmitted is configured as 100 subframes through the previous SI, transmission of the SI transmission subframe for analog beam direction n may have a period of 100 subframes, and an offset value therefor may be n.

In this specification, the subframe in which the SI is transmitted/transmittable may refer to a subframe in which a UE monitors a PDCCH scheduling SI through the CSS. Alternatively, a subframe in which the first SI is transmitted/transmittable may refer to a subframe in which a UE receives/attempts to receive a PDCCH scheduling the first SI. The PDCCH scheduling the SI may refer to a PDCCH scrambled with the SI-RNTI. The present invention includes monitoring the PDCCH scheduling the SI through the USS other than through the CSS.

Figure 9:
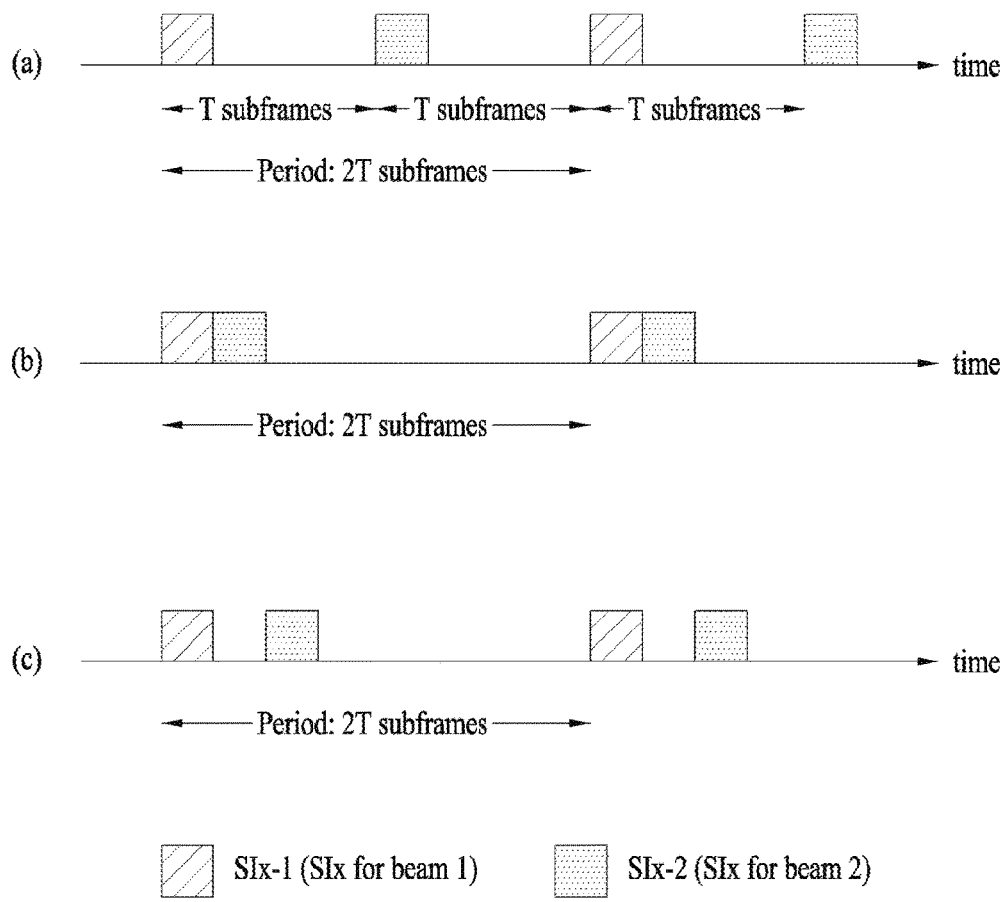
FIG. 9 illustrates an example of transmission/reception of system information according to the present invention.

FIG. 9 illustrates an example of transmission/reception of system information according to the present invention.

According to the present invention, the contents carried by the corresponding SI may differ among the analog beam directions in which the SI is transmitted (for example, Method 2-2 or Method 2-3). For example, if there is SI transmitted in analog beam direction A, the SI may contain another SI resource position or a PRACH resource position transmitted in analog beam direction A. If SI is transmitted in analog beam direction B, the SI may contain another SI resource position or a PRACH resource position transmitted in analog beam direction B. In the legacy LTE system, SIB1 is read on the same MIB resource or SIB1 resource on which reception of MIB/SIB1 is attempted in a specific cell. On the other hand, according to the present invention, there exist a plurality of first SIs carrying different contents in a cell, and the plurality of first SIs are transmitted/received using different time resources. Accordingly, UEs may acquire different first SIs in a specific cell. For example, according to the present invention, an SI that is successfully acquired in the same cell may vary depending on the position of the UE. For example, when the eNB can form two beam directions, the eNB may configure a specific SI (hereinafter, referred to as SIx) with a different content according to the beam directions and transmit the SIx in the corresponding beam direction. According to the legacy LTE system, the SIB transmitted in a specific cell may vary depending on the SI update procedure, and the SIB of the same contents is periodically transmitted before the SIB is updated (see 3GPP TS 36.331 document). On the other hand, according to the present invention, the different SIs do not mean that the contents thereof are not changed according to the SI update procedure but that the specific SI is transmitted with different contents within the same MCCH/BCCH modification period. For example, MIB/SIB1/SIBx of different contents may exist in a specific cell within the same MCCH/BCCH modification period.

Referring to FIG. 9, SIx (hereinafter referred to as SIx-1) for beam direction 1 and SIx (hereinafter referred to as SIx-2) for beam direction 2 may be configured, respectively. SIx-1 may be transmitted on the SIx time resource of beam direction 1, and SIx-2 may be transmitted on the SIx time resource of beam direction 2. SIx-1 and SIx-2 may be periodically transmitted. Each of SIx-1 and SIx-2 may be transmitted at specific intervals (e.g., FIG. 9(a)), may be transmitted in consecutive subframes (e.g., FIG. 9(b), FIG. 9(c)), or may be transmitted in non-consecutive subframes (e.g., FIG. 9 (c)). The time taken to transmit the SIx in a specific beam direction after the SIx is transmitted in the specific beam direction may be the SIx transmission period. SIx is transmitted at least once in each of all beam directions within the transmission period of SIx.

In order to identify the beam direction, an index or an ID may be assigned to each beam (i.e., each beam direction) or each beam group. The beam index may be tied to the symbol index at which the PSS/SSS/PBCH/SI is transmitted and implicitly agreed/defined between the eNB and the UE. An index used for differentiating the same type of SI transmitted in different beam directions may correspond to a beam index irrespective of its name.

RAR/Msg3/Msg4

The subframes resource position of the CSS monitored by the UE to receive a PDCCH scheduling the RAR, Msg3 retransmission (hereinafter, Msg3retx), or Msg4 may be given as follows.

Method 3-1: If the contents of SIB is variable according to the analog beam direction, PRACH transmission resource information (e.g., transmission subframe resource information) corresponding to the beam direction and the subframe information for monitoring the CSS scheduling the RAR/Msg3retx/Msg4 may be configured differently depending on the analog beam direction in which the SI is transmitted. Thereby, the UE may transmit the PRACH using the resource information configured for the analog beam direction in which the SIB is received (i.e., the beam direction used to transmit the SIB), and receive the RAR/Msg3retx/Msg4 using the resource information configured by the SI transmitted in the analog beam direction.

Method 3-2: PRACH transmission resource information (e.g., transmission subframe resource information) about all analog beam directions and subframe information for monitoring the CSS in which the UE schedules RAR/Msg3retx/Msg4 may be configured by the SI in common. After the UE transmits the PRACH in an analog beam direction suitable therefor, it may receive RAR/Msg3retx/Msg4 through a CSS subframes resource for scheduling of the RAR/Msg3retx/Msg4 that corresponds to the analog beam direction in which the PRACH transmission has most recently been performed.

Here, the subframe of the CSS monitored by the UE to receive the PDCCH scheduling the RAR, Msg3 retransmission, and Msg4 may refer to a subframe in which RAR, Msg3 retransmission, or Msg4 is transmitted/transmittable. Alternatively, the subframe of the CSS monitored by the UE to receive the PDCCH scheduling the RAR, Msg3 retransmission, and Msg4 may refer to a subframe in which the UE receives/attempts to receive the PDCCH scheduling RAR, Msg3 retransmission, and Msg4. Specifically, the PDCCH scheduling the RAR may refer to a PDCCH scrambled with the RA-RNTI, and the PDCCH scheduling Msg3 retransmission may refer to a PDCCH scrambled with a temporary C-RNTI. The present invention also includes the UE monitoring the PDCCH scheduling RAR, Msg3 retransmission, or Msg4 through the USS rather than through the CSS.

Paging

The subframes resource position of the CSS for monitoring the PDCCH to receive paging may be given as follows.

To receive paging, information about the subframes position where paging according to the analog beam direction may be transmitted may be configured through the PBCH (MIB), SI, or radio resource control (RRC), or defined in the specification. For example, when there are N analog beam directions in which the first SI is transmitted, subframe position information (e.g., period, offset, and/or duration) on which the PDCCH scheduling paging for each analog beam direction can be transmitted may be defined.

Here, the subframe of the CSS monitored by the UE to receive a PDCCH scheduling paging may refer to a subframe in which a paging message is transmitted/transmittable. Alternatively, the subframe of the CSS monitored by the UE to receive the PDCCH scheduling paging may refer to a subframe in which the UE receives/attempts to receive the PDCCH scheduling paging. Specifically, the PDCCH scheduling paging may refer to a PDCCH scrambled with a P-RNTI. The present invention includes the UE monitoring the PDCCH scheduling paging through the USS rather than through the CSS.

CSS for Others

In other general situations, the UE may steadily monitor the CSS for fallback or transmit power control (TPC). The position of the subframe for monitoring the CSS may be the same as the position of the monitoring subframe of the CSS for monitoring the PDCCH scheduling the RAR/Msg3retx/Msg4. Alternatively, a CSS scheduling data other than the RAR/Msg3retx/Msg4 may be configured/reconfigured for the UE via Msg4 and/or RRC.

Here, the subframe of the CSS monitored by the UE to receive the PDCCH for the TPC may refer to a subframe in which the TPC PDCCH is transmitted/transmittable. Therefore, the subframe of the CSS monitored by the UE in order to receive the PDCCH for the TPC may refer to a subframe in which the UE receives/attempts to receive the PDCCH for the TPC. Specifically, the PDCCH scheduling paging may refer to a PDCCH scrambled with the TPC-RNTI. The present invention includes the UE monitoring a PDCCH for fallback or transmit power control (TPC) through the USS rather than through the CSS.

B. USS Monitoring

The position of a subframe in which the UE monitors the USS may be configured as described below. In the present invention, the monitoring subframes resource may represent a monitoring timing or a monitoring resource.

First, to establish initial configuration, the subframes position at which the UE monitors the USS may be configured for the UE via Msg4 and/or RRC. Alternatively, the subframes position for monitoring the USS may be the same as the subframes resource for monitoring the "CSS for others" proposed in section A above.

Subframe information for USS monitoring may be reconfigured for the UE via RRC.

Here, the subframe in which the UE monitors the USS may refer to a subframe in which the PDCCH scheduling unicast data is transmitted/transmittable. Therefore, the subframe in which the UE monitors the USS may refer to a subframe in which the UE receives/attempts to receive the PDCCH scheduling the unicast data. Specifically, the PDCCH scheduling the unicast data may refer to a PDCCH scrambled with C-RNTI.

C. PDCCH Monitoring According to DCI Format/Size

If the UE monitors DCI formats of different DCI size at once, the blind decoding (BD) complexity of the UE and the required buffer size may increase. Therefore, considering the BD complexity of the UE, the subframes resource on which the UE monitors the PDCCH may be changed according to DCI format or size. In the present invention, the monitoring subframes resource may represent a monitoring timing or a monitoring resource.

For this purpose, the PDCCH monitoring subframe information for each DCI format or each DCI size (or DCI formats having the same DCI size) may be configured for the UE. This configuration information may be fixed in the specification or be configured for the UE via SIB (system information), RRC, or the like.

D. Downlink/Uplink Available Subframe

In the present invention, it is proposed that the network (e.g., eNB) configure a subframe (set) in which a UE is allowed to perform downlink reception/uplink transmission. Downlink reception subframes and uplink transmission subframes may be configured independently. Downlink reception subframes and uplink transmission subframes may be configured in units of a frame (e.g., 10 ms) or in units of multiple frames. This configuration may be transmitted analog beam direction-specifically via SI and/or configured UE-specifically through RRC.

Figure 10:
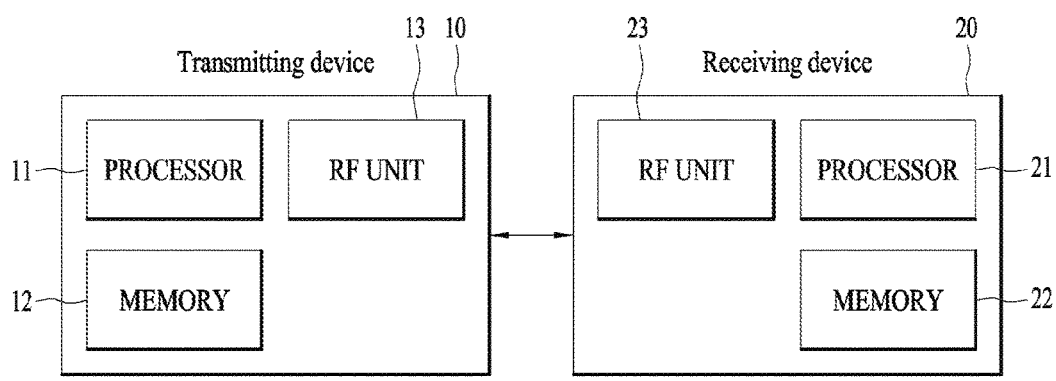
FIG. 10 is a block diagram illustrating elements of a transmitting device 10 and a receiving device 20 for implementing the present invention.

FIG. 10 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor according to the present invention may control the eNB RF unit to transmit certain types of system information (SI) in accordance with one of the proposals of the present invention. The eNB processor may control the eNB RF unit to transmit the SI of a particular type on different SI time resources, respectively. The eNB processor may control the eNB RF unit to transmit other types of SI according to the particular type of SI. The eNB RF unit may be controlled to transmit downlink signals (e.g., PDCCH/PDSCH) associated with the different SI time resources or the SIs transmitted on the different SI time resources, on downlink resources (e.g., subframes) corresponding to the different SI time resources on which the SI of the particular type or other type has been transmitted. The eNB RF unit may be controlled to transmit an uplink signal (e.g., RACH) associated with the different SI time resources or the SIs transmitted on the different SI time resources, on uplink resources corresponding to the different SI time resources on which the SI of the particular type or other type.

The UE processor according to the present invention may control the UE RF unit to receive certain types of system information (SI) according to one of the proposals of the present invention. The UE processor may attempt to receive/acquire the SI of a particular type on each of the different SI time resources. The UE processor may control the UE RF unit to receive/acquire another type of SI based on the particular type of SI received/acquired. The UE RF unit may be controlled to receive, on downlink resource(s) corresponding to the received/acquired particular or other type of SI, a downlink signal (e.g., PDCCH/PDSCH) associated with the SI time resource on which the SI of the particular type or other type has been received/acquired or the received/acquired SI, based on the downlink resource information included in the SI of the particular type or other type. The UE RF unit may be controlled to transmit, on uplink resource(s) corresponding to the received or acquired particular or other type of SI, an uplink signal (e.g., RACH) associated with the SI time resource on which the SI of the particular type or other type has been received/acquired or the received/acquired SI, based on the uplink resource information included in the SI of the particular type or other type.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for transmitting system information by a base station in a wireless communication system, the base station comprising a processor and a transceiver, the method performed by the base station and comprising:

transmitting:
      first type system information (SI) 1 with a first beam direction in a first type SI time resource 1, and
      first type SI 2 with a second beam direction in a first type SI time resource 2; and transmitting:
second type SI 1 with the first beam direction in a second type SI time resource 1 according to the first type SI 1, and
second type SI 2 with the second beam direction in a second type SI time resource 2 according to the second type SI 2,
wherein the first type SI time resource 1 and the first type SI time resource 2 are different from each other,
wherein the second type SI time resource 1 and the second type SI time resource 2 are different from each other,
wherein the first type SI 1 contains information on the second type SI time resource 1 for the second type SI 1,
wherein the first type SI 2 contains information on the second type SI time resource 2 for the second type SI 2,
wherein the first type SI time resource 1 and the first type SI time resource 2 are predefined, and
wherein each of the first type SI 1 and the first type SI 2 comprises information on a random access channel resource associated with a corresponding SI.

2. The method according to claim 1, wherein each of the first type SI 1 and the first type SI 2 or each of the second type SI 1 and the second type SI 2 comprises information on a set of downlink time units that may be monitored by a user equipment associated with a corresponding SI.

3. A base station for transmitting system information in a wireless communication system, the base station comprising:
a transceiver, and
a processor configured to control the transceiver,
wherein the processor is configured to:
control the transceiver to transmit:
first type system information (SI) 1 with a first beam direction in a first type SI time resource 1, and
first type SI 2 with a second beam direction in a first type SI time resource 2; and
control the transceiver to transmit:
second type SI 1 with the first beam direction in a second type SI time resource 1 according to the first type SI 1, and
second type SI 2 with the second beam direction in a second type SI time resource 2 according to the second type SI 2,
wherein the first type SI time resource 1 and the first type SI time resource 2 are different from each other,
wherein the second type SI time resource 1 and the second type SI time resource 2 are different from each other,
wherein the first type SI 1 contains information on the second type SI time resource 1 for the second type SI 1,
wherein the first type SI 2 contains information on the second type SI time resource 2 for the second type SI 2,
wherein the first type SI time resource 1 and the first type SI time resource 2 are predefined, and
wherein each of the first type SI 1 and the first type SI 2 comprises information on a random access channel resource associated with a corresponding SI.

4. The base station according to claim 3, wherein each of the first type SI 1 and the first type SI 2 or each of the second type SI 1 and the second type SI 2 comprises information on a set of downlink time units that may be monitored by a user equipment associated with a corresponding SI.

5. A method for receiving system information by a user equipment in a wireless communication system, the user equipment having a processor and a transceiver, the method performed by the user equipment and comprising:
receiving a first type system information (SI) of a beam direction of a base station among a plurality of first type SIs; and
receiving a second type SI of the beam direction of the base station according to the received first type SI, the second type SI among a plurality of second type SIs,
wherein the plurality of first type SIs are respectively present on first type SI time resources different from each other,
wherein the plurality of first type SIs schedule different second type SI time resources for the plurality of second type SIs, respectively,
wherein the plurality of first type SIs correspond to a plurality of beam directions of the base station, respectively,
wherein the plurality of second type SIs correspond to the plurality of beam directions of the base station, respectively,
wherein the first type SI time resource 1 and the first type SI time resource 2 are predefined, and
wherein each of the first type SI 1 and the first type SI 2 comprises information on a random access channel resource associated with a corresponding SI.

6. The method according to claim 5, wherein each of the plurality of first type SIs or each of the plurality of second type SIs comprises information on a set of downlink time units that may be monitored by the user equipment.

7. A user equipment for receiving system information in a wireless communication system, the user equipment comprising:
a transceiver, and
a processor configured to control the transceiver,
wherein the processor is configured to:
control the transceiver to receive a first type system information (SI) of a beam direction of a base station among a plurality of first type SIs; and
control the transceiver to receive a second type SI of the beam direction of the base station according to the received first type SI, the second type SI among a plurality of second type SIs,
wherein the plurality of first type SIs are respectively present on first type SI time resources different from each other,
wherein the plurality of first type SIs schedule different second type SI time resources for the plurality of second type SIs, respectively,
wherein the plurality of first type SIs correspond to a plurality of beam directions of the base station, respectively,
wherein the plurality of second type SIs correspond to the plurality of beam directions of the base station, respectively,
wherein the first type SI time resource 1 and the first type SI time resource 2 are predefined, and
wherein each of the first type SI 1 and the first type SI 2 comprises information on a random access channel resource associated with a corresponding SI.

8. The user equipment according to claim 7, wherein each of the plurality of first type SIs or each of the plurality of second type SIs comprises information on a set of downlink time units that may be monitored by the user equipment.

* * * * *